UNITED STATES PATENT OFFICE.

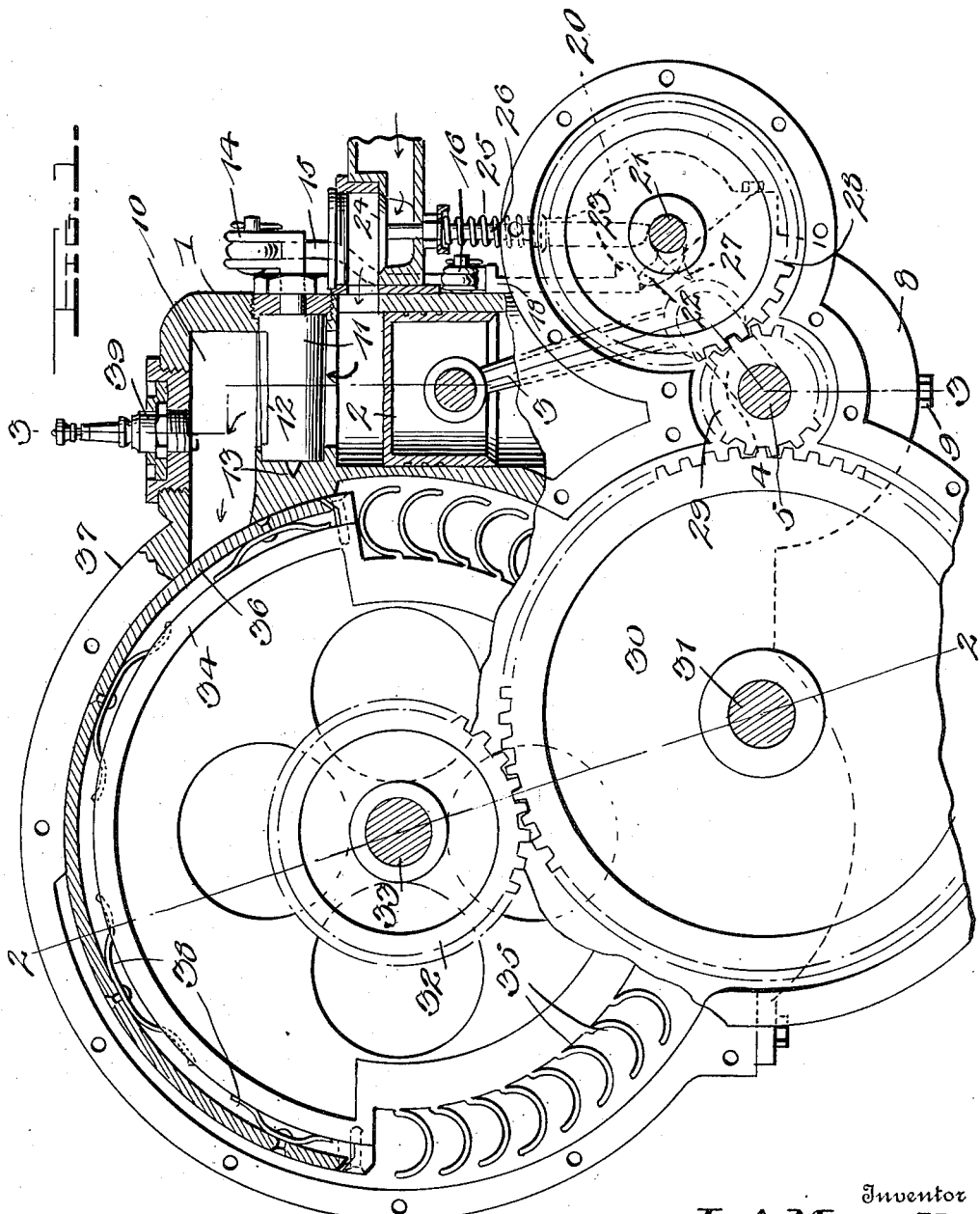

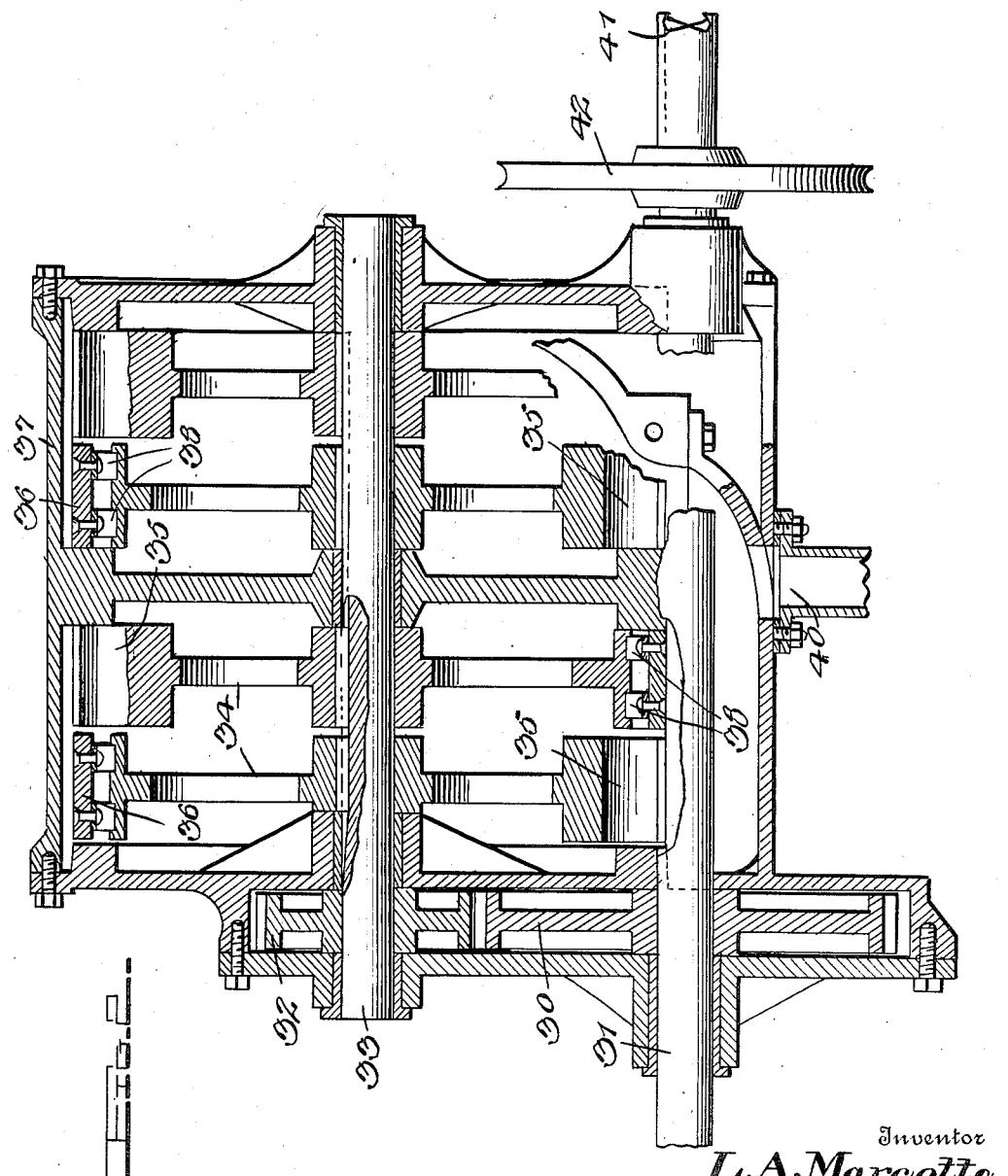

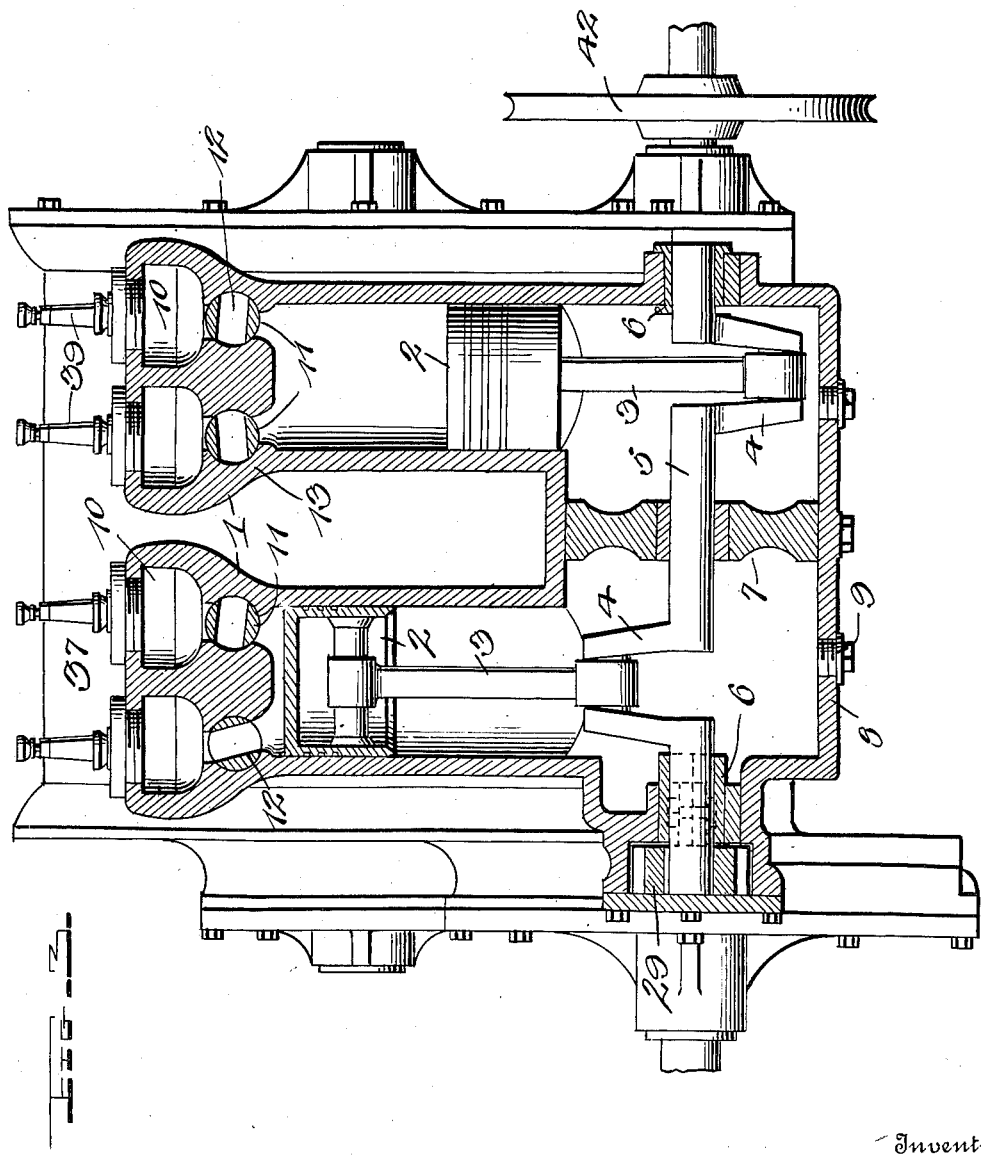

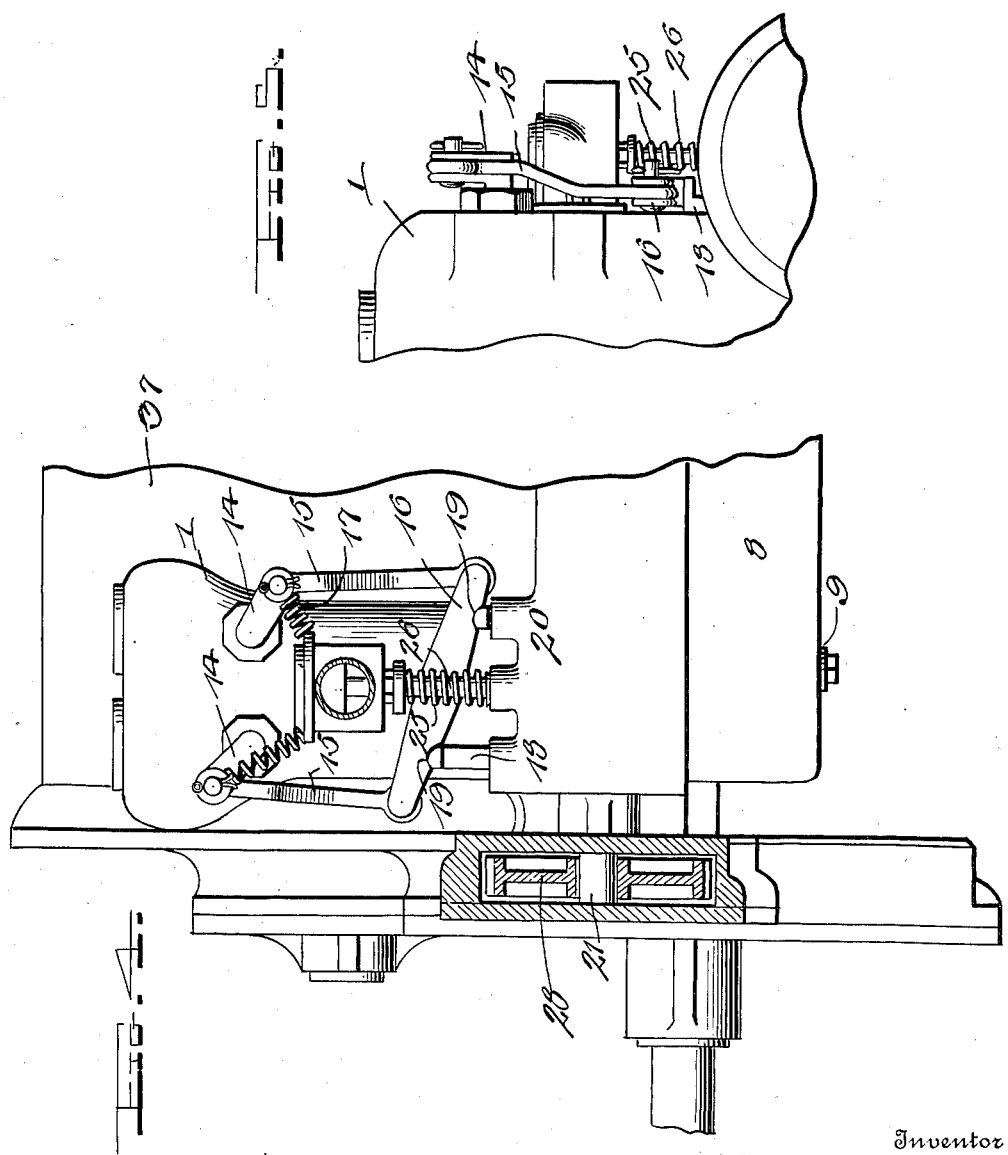

LOUIS A. MARCOTTE, OF BEVERLY COVE, MASSACHUSETTS, ASSIGNOR OF ONE-HALF TO WILLIAM HERD, OF BEVERLY COVE, MASSACHUSETTS.

INTERNAL-COMBUSTION ENGINE.

1,074,635.

Specification of Letters Patent.

Patented Oct. 7, 1913.

Application filed July 15, 1912. Serial No. 709,553.

*To all whom it may concern:*

Be it known that I, LOUIS A. MARCOTTE, a citizen of the United States, residing at Beverly Cove, in the county of Essex and State of Massachusetts, have invented certain new and useful Improvements in Internal-Combustion Engines, of which the following is a specification, reference being had to the accompanying drawings.

This invention comprehends certain new and useful improvements in internal combustion engines of the rotary or turbine type, and the invention has for its primary object an improved engine of this character embodying pumps which will effectively compress the charge, primary and secondary intake valves which will automatically control the admission of the compressed charge into the explosion chambers in predetermined and regular order and a rotor divided into any desired number of sections, each of which includes a series of peripheral pockets extending substantially half the circumference of the rotor, and a peripheral outwardly spring-pressed packing segment comprising the remaining portion of the rotor circumference.

The invention also has for its object a simple, durable and efficient construction of internal combustion engine of the type indicated, embodying a novel arrangement of intake valves including primary intake valves of the puppet or vertically reciprocating type and secondary intake valves of the rolling or rotary type, the former controlling the admission of the charges from the carbureter to the cylinders of the pumps and the latter controlling the admission of the compressed charges from the pump cylinders to the explosion chambers.

A still further object of the invention is, in an engine of this character, an improved construction and arrangement of valve operating mechanism, whereby the valves will be positively operated in their regular and predetermined order by a simple cam mechanism hereinafter specifically described. And the invention also aims to generally improve engines of this class so as to simplify their construction, render their operation regular with little vibration and otherwise efficient, and to render them generally more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings, in which, Figure 1 is a partial side elevation and partial section of an engine embodying the improvements and principles of my engine; Fig. 2 is a transverse sectional view on the line 2—2 of Fig. 1, parts being shown in side elevation; Fig. 3 is a similar view on the broken line 3—3 of Fig. 1; Fig. 4 is a detail elevation illustrating particularly parts of the valve operating mechanism; and Fig. 5 is a side view of the mechanism illustrated in Fig. 4.

Corresponding and like parts are referred to in the following description and designated in the accompanying drawings by like reference characters.

In the present embodiment of the invention, my improved engine includes two vertically disposed pump cylinders 1 in which charge compressing pistons 2 are mounted for reciprocating movement. Each piston is pivotally connected by a pitman 3 to a crank 4 of a crank shaft 5, said crank shaft extending longitudinally, as shown, and having its cranks set at an angle of 180° relative to each other. The crank shaft 5 is journaled at its ends in bearings 6 and intermediate of its ends in a bearing 7, said bearings being contained within a crank case 8 having the usual drain plugs 9 in the bottom thereof.

The upper ends of the cylinders 1 constitute compression chambers, and the compressed charges are passed from said chambers into explosion chambers 10, of which there are two for each pump, as best illustrated in Fig. 3. The passages establishing communication between each compression chamber and its corresponding pair of explosion chambers are separate and distinct from each other and controlled by oscillatory valves 11 having ports 12 extending transversely therethrough, said valves being mounted for an oscillatory movement about their longitudinal axes in bearings 13 formed in the casing wall. In order to operate these valves 11, each valve is provided at its outer end with a crank arm 14 which is pivotally connected to the upper end of a link rod 15, the lower ends of said link rods being connected to the ends of a rocker bar 16 fulcrumed intermediate of its ends to rock about a substantially horizontal axis. Expansion springs 17 engage the respective arms 14 and react against stationary seats formed on the casing wall so as to return the valves to their closed position, and to open said valves, I provide in connection with the crank arms 14, link rods 15, and rocker bar 16, push rods 18, one pair for each rocker bar. These push rods are seated at their upper ends in recesses 19 that are formed in the lower edge of the rocker bar 16 near the extremity of the latter and work vertically, as shown, through the cam case 20 in which a cam shaft 21 is journaled, said shaft extending longitudinally, as clearly illustrated in the drawings. The shaft 21 is formed with cams 22, one for each push rod, said cams being arranged in longitudinally spaced relation to each other on the shaft and so placed or timed that they will operate the push rods in the desired predetermined order, as will more fully appear when describing the operation of the engine. The cams, in the present instance, operate against lugs 23 that are formed on the push rods 18.

The oscillatory valves 11 just described are the secondary valves that control the passage of the compressed charges from the compression chambers to the explosion chambers and to admit the charges from the carbureter to the compression chambers of the pumps, I provide primary intake valves 24, one for each pump. The valves 24 are of the reciprocating or puppet type, being held normally on their seats by springs 25 which encircle the valve rods 26, said valve rods being disposed vertically in the cam case 20 and located intermediate of the adjoining push rods 18, as best illustrated in Fig. 4. The lower ends of the valve rods 26 are engaged by cams 27 formed on the shaft 21, whereby the primary intake valves are positively opened one after the other.

The cam shaft 21 is driven by being provided at one end with a gear wheel 28 which meshes with a spur pinion 29 on the adjoining end of the crank shaft 5, and said pinion is in turn meshed with a relatively large gear wheel 30 on the engine drive shaft 31, said gear wheel 30 also meshing with a gear wheel 32 on the rotor shaft 33.

34 designates the rotor which, in the present instance, is divided into four parts or sections, although it is to be understood that the invention is not limited in this regard, but that any desired number of parts or sections may be employed. Each section of the rotor 34 is formed with preferably integral peripheral pockets 35 which extend, in the present embodiment of the invention, substantially one-half of the circumference of the rotor, the remaining portion of the rotor periphery being taken up by a segmental metallic packing strip 36 which is pressed outwardly against the rotor case 37 by a plurality of arched leaf springs 38, as clearly illustrated in the drawings.

There are two rotor sections for each pump, as clearly illustrated, and the series of pockets of each rotor is set at an angle of 180° relative to the pockets of the adjoining rotor, the series of pockets of one pair of rotor sections being set in at an angle of 90° to the series of the pockets of the other pair of sections. The timing mechanism for the ignition system is so arranged that the spark plug 39 or similar ignition device will operate to produce a spark just after the compressed charge has been admitted into the explosion chamber 10, at which time, the series of pockets will just commence to be in registry with such explosion chamber. The exhaust, in the present instance, is at the bottom of the rotor casing and is indicated at 40.

At 41 will be seen the cranking clutch formed on the forward end of the drive shaft 31, and at 42, there is shown the fan driving wheel which is mounted on the drive shaft.

From the foregoing description in connection with the accompanying drawings, the operation of my improved rotary internal combustion engine will be apparent. In the practical operation of the device, the valves and their operating mechanism are so arranged that a compressed charge will be admitted into the explosion chambers in regular order, which is as follows, one, three, two, four, and each charge will be exploded in due order, whereby there will be four explosions or impulses on every revolution of the crank shaft 5. As the shaft 5 turns, the primary valves 24 will be raised so as to admit charges from the carbureter into the compression chambers of the pumps in succession, and the cams 22 will act so as to rock the bar 16 and open the valves 11. Thus, the charges will be compressed by the pistons 2 and the compressed charges will be admitted by the valves 11 into the explosion chambers 10 and exploded therein just at the time the corresponding rotor section reaches a point where its peripheral pockets commence to register with the adjoining or corresponding explosion chamber.

I have neither described nor shown any means for cooling the engine; nor any means for lubricating the different parts, as the same form no part of my present invention, and it will be understood that any cooling or lubricating means may be employed. It is also to be understood that various changes may be made in the construction, arrangement and proportions of the parts without departing from the scope of the invention, as defined in the appended claims.

What I claim is:—

1. An engine of the character described, including a casing, a rotor mounted in said casing, the casing being provided with an explosion chamber communicating with the rotor casing and with a compression chamber adapted to communicate with the explosion chamber, an oscillatory valve controlling the communication between the compression and explosion chambers, a piston mounted in the compression chamber, means for reciprocating the piston therein, the oscillatory valve being provided at its outer end with a crank arm, a link rod pivotally connected to said crank arm, a rocker bar to which the link rod is connected, a cam shaft provided with a cam, and a push rod engageable by said cam and acting against the rocker bar, for the purpose specified.

2. An engine of the character described, including a casing, a rotor mounted therein and embodying a plural number of parts, the casing being provided with two explosion chambers communicating with the interior of the said casing and with a compression chamber common to both explosion chambers, oscillatory valves controlling the communication between the compression chamber and the explosion chambers, a piston mounted in the compression chamber, means for reciprocating the piston therein, the valves being provided at their outer ends with crank arms, link rods pivotally connected to said arms, a rocker bar to which the link rods are connected, an intake valve adapted to control the passage of an explosive charge into the compression chamber, a valve rod connected to the intake valve, a cam shaft provided with a cam engageable with said valve rod and with other cams, and push rods engageable by said other cams and acting against the rocker bar.

3. An engine of the character described, including a casing, a rotor mounted therein and embodying a plural number of parts, the casing being provided with two explosion chambers communicating with the interior of the casing and with a compression chamber common to both explosion chambers, valves controlling communication between the compression chamber and the explosion chambers, a piston mounted in the compression chamber, means for reciprocating the piston therein, an intake valve adapted to control the passage of a gaseous charge into the compression chamber, and means for opening said intake valve and for also opening the first named valves in alternate relation to each other.

4. An engine of the character described, including a casing, a rotor mounted therein and embodying a plural number of parts, the casing being provided with explosion chambers communicating with the interior of the casing and with compression chambers, oscillatory valves controlling the communication between the compression chambers and the explosion chambers, pistons mounted in the compression chambers, means for reciprocating the pistons therein, the valves being provided at their outer ends with crank arms, link rods pivotally connected to said arms, rocker bars to which the link rods are connected, a cam shaft provided with cams, and push rods engageable by said cams and acting against the rocker bars, for the purpose specified.

5. An engine of the character described, including a casing, a rotor mounted therein and embodying a plural number of parts, the casing being provided with two explosion chambers communicating with the interior of the rotor casing and with a compression chamber common to both explosion chambers, rolling valves controlling the communication between the compression chamber and the explosion chambers, a piston mounted in the compression chamber, means for reciprocating the piston therein, the valves being provided at their outer ends with crank arms, link rods pivotally connected to said arms, a rocker bar to which the link rods are connected, a cam shaft provided with cams, and push rods engageable by said cams and acting against the rocker bar, for the purpose specified.

6. An engine of the character described, including a casing, a rotor mounted therein and embodying a plural number of parts, the casing being provided with two separate and distinct explosion chambers communicating with the interior of the rotor casing and with a compression chamber common to both explosion chambers, a piston mounted in said compression chamber, means for reciprocating said piston therein, oscillatory valves adapted to control communication between the compression chamber and the explosion chambers, the valves being provided at their outer ends with crank arms, links rods pivotally connected to said arms, a rocker bar connected to said link rods, a cam shaft provided with cams, push rods engaging said rocker bar and engageable by said cams, a primary intake valve adapted to admit charges into the compression chamber, said intake valve being provided with a valve rod located between the push rods, and a cam on the cam shaft engageable with the valve rod to actuate the said primary intake valve.

7. An engine of the character described, including a casing, a rotor mounted therein, and embodying a plural number of parts, the casing being provided with two separate and distinct explosion chambers for the respective parts of the rotor and with a compression chamber common to both explosion chambers, oscillatory valves controlling communication between the compression chamber and the explosion chambers, a piston mounted in the compression chamber, a crank shaft operatively connected to the piston to reciprocate the latter, a rocker bar operatively connected to the oscillatory valves, a cam shaft provided with cams, push rods engageable by said cams and acting against the rocker bar to actuate the latter, an intake valve controlling communication of charges into the compression chamber, said last named valve being provided with a valve rod, a cam on the cam shaft adapted to engage the valve rod to actuate the intake valve, a gear wheel on the cam shaft, a pinion on the crank shaft and engaging said gear wheel, a shaft on which the rotor is mounted, a gear wheel on the rotor shaft, a drive shaft, and a gear wheel on said drive shaft meshing with the gear wheel on the rotor shaft and the pinion on the crank shaft.

In testimony whereof I hereunto affix my signature in the presence of two witnesses.

LOUIS A. MARCOTTE.

Witnesses:
WILLIAM HERD,
ARTHUR A. WOODBURY.